United States Patent [19]

Kuo

[11] Patent Number: 5,285,386
[45] Date of Patent: Feb. 8, 1994

[54] MACHINE TRANSLATION APPARATUS HAVING MEANS FOR TRANSLATING POLYSEMOUS WORDS USING DOMINATED CODES

[75] Inventor: June-Jei Kuo, Taipei, Taiwan

[73] Assignee: Matsushita Electric Industrial Co., Ltd., Kadoma, Japan

[21] Appl. No.: 546,940

[22] Filed: Jul. 2, 1990

[30] Foreign Application Priority Data

Dec. 29, 1989 [JP] Japan .................................. 1-340674

[51] Int. Cl.$^5$ ............................................. G06F 15/38
[52] U.S. Cl. ............................ 364/419.02; 364/920.4
[58] Field of Search ........................... 364/417, DIG. 2

[56] References Cited

U.S. PATENT DOCUMENTS

| | | | |
|---|---|---|---|
| 4,635,199 | 1/1987 | Muraki | 364/419 |
| 4,791,587 | 12/1988 | Doi | 364/DIG. 2 |
| 4,831,529 | 5/1989 | Miik et al. | 364/419 |
| 4,868,750 | 9/1991 | Kucera et al. | 364/419 |
| 4,914,590 | 4/1990 | Loatman et al. | 364/419 |
| 4,916,614 | 4/1990 | Kaji et al. | 364/419 |
| 4,931,936 | 6/1990 | Kugimiya | 364/419 |
| 4,942,526 | 7/1990 | Okajima et al. | 364/419 |
| 4,980,829 | 12/1990 | Okajima et al. | 364/419 |
| 4,994,967 | 2/1991 | Asakawa | 364/419 |
| 5,056,021 | 10/1991 | Ausborn | 364/419 |
| 5,068,789 | 11/1991 | van Vliembergen | 364/419 |

FOREIGN PATENT DOCUMENTS 260367 11/1986 Japan .

Primary Examiner—Roy N. Envall, Jr.
Assistant Examiner—A. Bodendorf
Attorney, Agent, or Firm—Spencer, Frank & Schnedier

[57] ABSTRACT

A machine translation apparatus includes: a transfer dictionary for translation word searching for storing therein a semantic code representative of semantic categorization of a source language word, a dominated code which is a semantic code of a word relatable to the source language word, and a translation word of a target language corresponding to the dominated code; a dominated code and semantic code searching unit for executing a logical AND operation applicable to a word at each node of an intermediate structure obtained by parsing an inputted source language sentence, to be performed on the dominated code of the each node and the semantic code of a node related to the each node, which are respectively stored in the transfer dictionary for translation word searching, and determining proper ones of the dominated code and the semantic code, respectively and a translation word searching unit for searching a translation word for each node corresponding to the dominated code obtained by the dominated code and semantic code searching unit, from among target language translation words for the source language word stored in the transfer dictionary for translation word searching. With the aforesaid machine translation apparatus, a proper translation word for a polysemous word can be automatically selected.

6 Claims, 12 Drawing Sheets

FIG. 3A-1

| FIG. 3A-1 |
|---|
| FIG. 3A-2 |

| WORD | LEXICAL CATEGORY | DOMINATED CODE | SEMANTIC CODE | TRANSLATION WORD | ENGLISH MEANING OF TRANS. WORD |
|---|---|---|---|---|---|
| 彼 (KARE) | N | d | s5030 | 他 | HE |
| 私 (WATASHI) | N | d | s5010 | 我 | I |
| 字引 (JIBIKI) | N | d | s848e | 字典 | DICTIONARY |
| 顔 (KAO) | N | s49 | s320 | 表情 | EXPRESSION |
| | | s178 | s611 | 相貌 | LOOK |
| | | s451, s474, s655 | s477 | 面子 | DIGNITY |
| | | d | s610 | 臉 | FACE |
| ... | ... | ... | ... | ... | ... |

FIG. 3A-2

| 難しい (MUZUKASHII) | ADJ | s320 | s492a | 不高興 | UNHAPPY |
|---|---|---|---|---|---|
| | | s608 | s165a | 難似治好 | DIFFICULT TO CARE |
| | | s819 | s133a | 複雑 | COMPLEX |
| | | s680 | s133a | 複雑 | COMPLEX |
| | | s702 | s133a | 複雑 | COMPLEX |
| | | s817b | s133a | 複雑 | COMPLEX |
| | | d | s165a | 困難 | DIFFICULT |
| | ...... | ...... | ...... | ...... | ...... |
| ...... | | | | | |

FIG. 3B-1

| FIG. 3B-1 |
|---|
| FIG. 3B-2 |

| WORD | LEXICAL CATEGORY | DOMINATED CODE | SEMANTIC CODE | TRANSLATION WORD | ENGLISH MEANING OF TRANS. WORD |
|---|---|---|---|---|---|
| する (SURU) | v | s096 | s361 | 発出 | MAKE |
| | | s129 | s361 | 值 | WORTH |
| | | s747 | s361 | 説 | SAY |
| | | s872 | s361 | 唱 | SING |
| | | s852 | s361 | 吟 | RECITE |
| | | s920 | s361 | 吃 | EAT |
| | | s320 | s361 | 露出 | SHOW |
| | | d | s361 | 做 | DO |

FIG. 3B-2

| 引く(HIKU) | v | | | |
|---|---|---|---|---|
| | | s848e | s387a | LOOK UP |
| | | s120 | s263b | SUBTRACT |
| | | s331c | s450a | ATTRACT |
| | | s1860 | s335a | QUOTE |
| | | s760a | s335a | QUOTE |
| | | s047g | s387a | DRAW |
| | | s111a | s387a | DRAW |
| | | s9870 | s387a | DRAW |
| | | s608c | s387a | HAVE |
| | ‥‥ | ‥‥ | ‥‥ | |
| | | d | s387a | PULL |
| ‥‥ | ‥‥ | ‥‥ | ‥‥ | |

FIG. 7 PRIOR ART

```
(DEFWORD'(<word>                                    ----- the word itself
         (SENSES (<senses1><senses2> ...))          ----- for homograph
         (CLASS   <part of speech>)                 ----- syntactic class
         (syntactic features)                       ----- subclass
         (SM      (<semantic marker>...))           ----- semantic marker
         (SELF    (<self value>...))                ----- object hierarchy
         (CHINESE <default chinese>)                ----- default translation
         (GEN     (<word selection function>...))   ----- word selection
         (IDIOM   (<idiom expression>...))          ----- for idioms
         (SYNONYM <synonym>)                        ----- synonym
    ))

(defword'(take
                  (class verb)
                  (vptype(VP1 VP4 VP7 VP10 VP18 VP19 VP21))
                  (vnumpers(or(11)(12)(21)(22)(23)))
                  (chinese |拿|)
                  (gen ((np (case
                            ((a picture )
                                (con-rep-last-word |拍| np |相片| ))
                            ((a TIME-UNIT) |花費| )
                            ((a animal) |帶著| )
                            ((a THING-TO-EAT) |吃| )
                            ((a cold-noun )
                                (rep-to np |感冒|))
                            ((a medicine ) |吃|)
                            ( A ( @IF((self nomhd ) bicycle)
                                (concat-word |騎| np) ))
                            ((a bicycle ) |騎| )
                            ( A ( @IF((self nomhd ) vehicle)
                                (concat-word |搭| np) ))
                            ((a vehicle ) |搭| )
                        ))
                        (advp ( case ( AROUND
                                (concat-word |帶著| NP |到處跑|))
                               ( OFF ( @IF ((self np) clothes)
                                        |脫掉|))
                        ))
                 ))
        ))
```

MACHINE TRANSLATION APPARATUS HAVING MEANS FOR TRANSLATING POLYSEMOUS WORDS USING DOMINATED CODES

BACKGROUND OF THE INVENTION

1. Field of the Invention

The present invention relates to a machine translation apparatus capable of automatically selecting a suitable translation word and reducing the burden on a user.

2. Description of the Related Art

New information is increasing rapidly in the 20th century, in what might be called a knowledge explosion age. People are impelled to perpetually enrich their knowledge in order not to be left behind the times. New knowledge comes from both inside and outside one's nation. Ordinary people read their mother language faster than foreign languages, so translations are important. It is now the time that manual translation should be replaced with mechanical translation, i.e., a machine translation system.

In a machine translation system, the language which is to be inputted for translation is called the source language, whereas the translated and outputted language is called a target language. For example, in the Japanese-Chinese machine translation system, the source language is Japanese and the target language is Chinese. The difference in syntax and semantics between the source and target languages is an important factor which influences the quality of machine translation. Consider the following translation example:

(Japanese) 彼 は 夢 を 見 た.    (He had a dream)
(Chinese) 他 有 了 夢.    (He saw a dream)
→ (Translation without parsing the difference of syntax and semantics)
(Chinese) 他 做 了 夢.    (He had a dream)
→ (Translation with parsing the difference of syntax and semantics)

According to a conventional method, in order to transfer the syntax and semantics of a source language to those of a target language in a complete and precise form, the data structure of the source language is simplified to have a simple intermediate structure capable of processing a broad range of information. An example of such an intermediate structure is a dependency structure. With the simplified data structure, a translation can be processed with fewer transfer rules and with higher efficiency. This method is called the transfer system. FIG. 6 is a flow chart illustrating the translation procedure of the transfer system. As shown in FIG. 6, a machine translation apparatus using the transfer system is constructed of, in addition to a reference dictionary, (1) a source language parsing unit, (2) an intermediate structure transfer unit, and (3) a target language generating unit. The most difficult and significant operation performed by the intermediate structure transfer unit is to search for an optimum translation of a source language word. Languages have many meanings, and almost each word is polysemous. A translation word should be selected therefore in accordance with the meaning of the source word. In other words, a suitable translation word cannot be selected unless the meaning of the word in the source language can be grasped correctly. For example, the Japanese word "ひく" has at least the following five meanings and the translation equivalents thereof change correspondingly:

| Japanese | Chinese | |
|---|---|---|
| 1. 風邪をひく | ( 上感冒 ) | catch a cold |
| 2. 線をひく | ( 畫線 ) | draw a line |
| 3. 辞書をひく | ( 査字典 ) | consult a dictionary |
| 4. 人をひく | ( 引人注意 ) | draw a person's attention |
| 5. 数をひく | ( 減去数 ) | reduce a number |

As will be understood from the above example, it is most important for the intermediate structure transfer unit to efficiently grasp the meaning of each word of the source language. Conventional techniques dealing this subject are classified into the following two types:

(I) the user participation system, and
(II) the reference dictionary system, which refers to a dictionary storing all possible translation equivalents.

These two systems will be described below.

(I) User Participation System

There is disclosed, for example, in Japanese Patent Laid-open Publication No. 61-260367, a technique whereby translation equivalents having the highest use frequency of use are selected from a reference dictionary, and the user determines improper translation equivalents and corrects them. The determination and correction by the user are registered in a learning file for reference in the succeeding selection of translation equivalents, whereby the use of the reference dictionary to select translation equivalents of a higher use frequency makes it possible to ensure improved translation. FIG. 5 is a block diagram showing the structure of a machine translation apparatus using this method. Consider the following two sentences of a source language (in English):

(1) I write a letter.
(2) And, I mail the letter.

It is assumed that translation words for "letter" stored in the English-Japanese dictionary are:

1. 字
2. 手紙

Using the translation word (1), the English sentence (1) is translated into "私は一つ字を書く". Then, the user changes the translation word for "letter" to "手紙" by using an interactive function of the apparatus to thereby obtain the translation "私は一枚の手紙を書く". The changed result is stored in a learning file of an external storage as learnt experience. Using this learnt experience, the sentence (2) is translated into "そして、私はこの手紙を出す" and never into "私はこの字を出す".

(II) Reference Dictionary System

For example, a Knowledge-Base English-To-Chinese Machine Translation System (KBMTS) developed by Electronics Research and Service Organization of the Industrial Technology Research Institute (ERSO, ITRI) in Taiwan, ROC, as described in "Electronics Development Monthly" (Issue No. 122, pp. 9 to 23, February 1988), uses a semantic marker system. As shown in FIG. 7, which refers to the illustration on page 20 of the above-mentioned literature, all possible translation equivalents are registered in a reference dictionary, and in selecting a proper translation equivalent of a word, this system picks up semantic markers of related words and processes necessary operations relative to the semantic markers by using the reference dictionary to obtain the proper translation word.

For example, in determining the translation word for the verb "take" in the phrase "take a bus", since a word related with the verb "take" is the object word "bus", the semantic marker for "bus" can be identified as [vehicle] upon reference to the noun in the reference dictionary. Accordingly, as a result of reference processing, the most suitable translation word for "take" is found to be "忙" in Chinese. Then, the correct translation of the phrase becomes "搭车" in Chinese.

The above-described technique "(I) User Participation System" provides translations of good quality. However, there are the following problems. Namely, experiences registered in the learning file of the external storage are all short-term experiences, and they are of no use for translation processing which requires long-term experiences. It is necessary also to select a proper learning file in dependence on what is to be translated, and the user is required to participate in the translation, which is not automatically carried out. This system is applicable only to conversational translations of small range.

The "(II) Reference Dictionary System" can obtain proper translation equivalents on condition that the corresponding data have been registered in a transfer reference dictionary. In other words, the transfer reference dictionary should be provided with a full and complete semantic marker system. If it is not full and complete, the same data may be present more than one in the dictionary, or memories may be used wastefully, resulting in poor efficiency.

In view of the above problems, the present invention aims at providing an automatic translation apparatus of high quality and efficiency capable of automatically searching for a proper translation word while reducing the burden on the user, and capable of registering data in a transfer dictionary in a specific manner so as to store a maximum amount of data.

SUMMARY OF THE INVENTION

In order to solve the above objects, the machine translation apparatus of this invention comprises: a transfer dictionary for translation word searching, said transfer dictionary storing therein a semantic code representative of semantic categorization of a source language word, a dominated code which is a semantic code of a word which can be related to said source language word, and a translation word of a target language corresponding to said dominated code; a dominanted code and semantic code searching unit for executing a logical AND operation, for a word at each node of an intermediate structure obtained by parsing an inputted source language sentence, between said dominated code of said each node and said semantic code of a node related to said each node, respectively stored in said transfer dictionary for translation word searching, and determining proper ones of said dominated code and said semantic code; and a translation word searching unit for searching a translation word for each node corresponding to said dominated code obtained by said dominated code and semantic code searching unit, from target language translation words for said source language word stored in said transfer dictionary for translation word searching.

With the machine translation apparatus constructed as specified above according to this invention, a dominated code of a word is determined by a semantic code of a related node, and a translation word is selected in accordance with the dominated code. Therefore, the proper translation word for a polysemous word can be automatically selected, thereby improving the efficiency of machine translation and reducing the burden on the user.

BRIEF DESCRIPTION OF THE DRAWINGS

FIGS. 3A-1, 3A-2, 3B-1 and 3B-2 are diagrams showing the contents of the transfer dictionary for translation word searching of the embodiment.

FIG. 7 shows an example of the contents of a dictionary used in KBMTS.

DESCRIPTION OF THE PREFERRED EMBODIMENT

Figure 1:
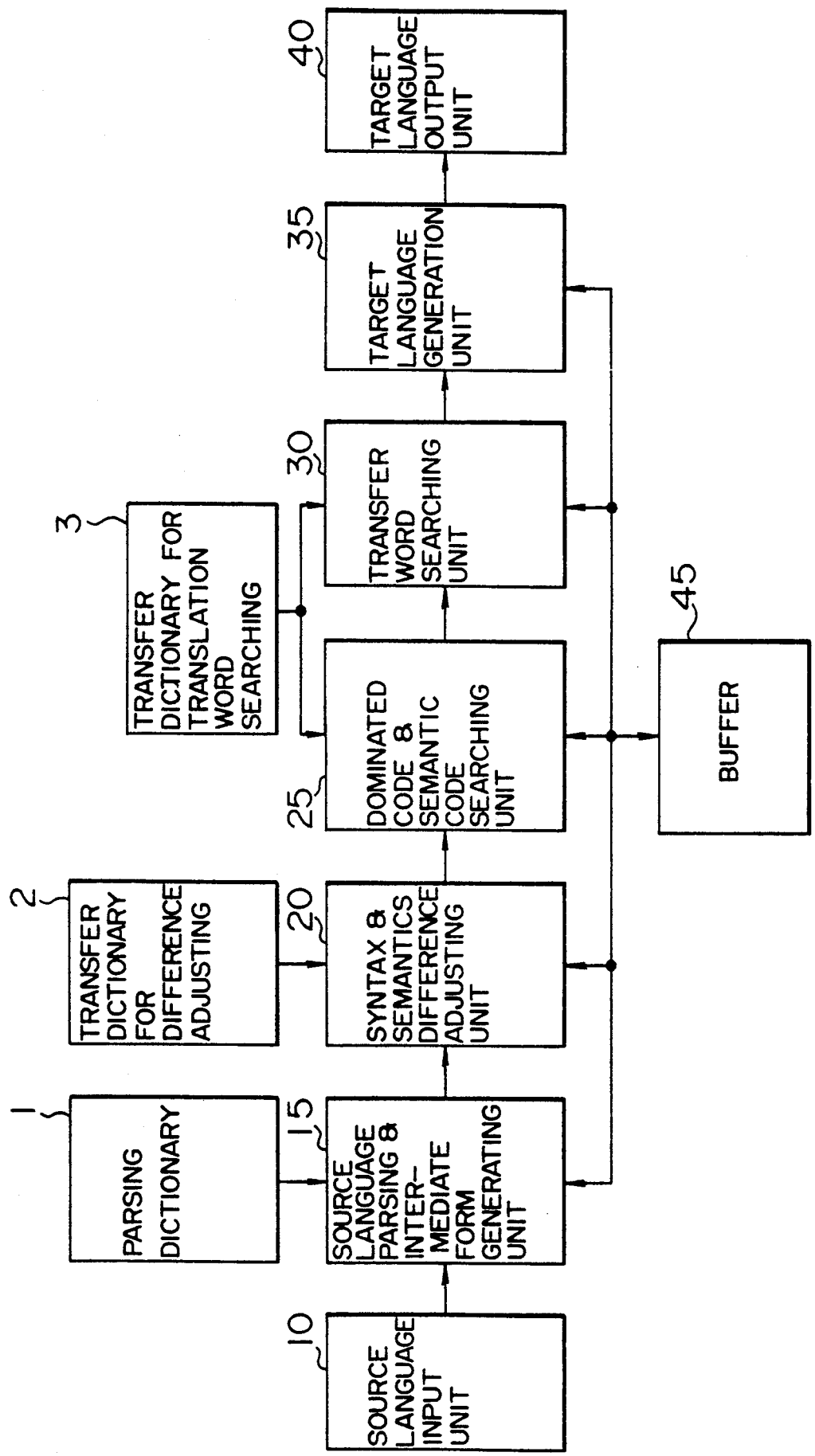
FIG. 1 is a block diagram showing the structure of a machine translation apparatus according to an embodiment of this invention.

The present invention adopts a semantic categorization method in place of the conventionally used semantic marker method. In the following embodiment, the semantic categorization method explained in the synonym dictionary published by Japanese Kadokawa Shoten (1985) is used. This semantic categorization method uses a hexadecimal four digit number to indicate all information of a word. The categorization is divided into a large categorization (indicated by the first digit of the number), middle categorization (indicated by the second digit), small categorization (indicated by the third digit), and fine categorization (indicated by the fourth digit). In this synonym dictionary, all words are classified into ten large categorizations including "nature", "property", "change", "action", "feeling", "person", "inclination", "society", "culture", and "article". Each large categorization is classified into ten middle categorizations. In this embodiment, the following format with the character s added at the left of a four digit number is used.

s0 (belongs to "nature")
s02 (belongs to "weather" in "nature")
s028 (belongs to "wind" in "weather")
s028a (belongs to "pressure" in "wind")

With such hierarchic categorization codes, the meaning range of an upper order character in the semantic code is broader than a lower order semantic code character. That is, the lower the order of a semantic code character, the narrower the meaning range thereof becomes. Semantic codes for all categorizations do not need to be stored, but only those semantic codes necessary for a particular application are registered, thereby reducing memory capacity. In addition, since a semantic code is represented by using numerals, it becomes possible to effect mathematical processing such as a logical AND operation, collation of strings, etc., further to process semantic categorization codes, and to obtain significant information which is generated by the use of semantic categorization codes.

The translation equivalent for each word changes with the use of a related word. For example, the Japanese word "い⼰" has different Chinese translation equivalents such as "⾊", "⾐", "⾔", "⾚" and "化" in correspondence with an object thereof. The word "引く" has therefore at least five semantic codes. An object is a word related to a verb, and the object dominates the meaning of the verb. Namely, the semantic code of an object word is a dominated code of the verb. If a related word to a source language word can be discriminated through parsing, a logical AND operation between possible semantic codes of a word under processing and dominated codes of its related or adjacent word allows a dominated code of the word under processing to be identified. The proper translation equivalent and semantic code of the word under processing can be obtained by referring to a transfer dictionary for translation word searching by using the obtained dominated code as a key. If the transfer dictionary for translation word searching does not include a translation word corresponding to the dominated code of the word under processing, a default or first priority semantic is used as the dominated code of the word under processing. The format of the transfer dictionary for translation word searching of this embodiment is shown in FIGS. 3A-1, 3A-2, 3B-1, and 3B-2. A noun (excepting an adjective modifier) dominates the meaning of a verb, adjective, or adjective modifier, so the semantic code of a noun becomes a dominated code of a verb, adjective, or adjective modifier. The semantic code of a verb or adjective is a dominated code of an adverb, and the semantic code of an adverb is a dominated code of another adverb. Accordingly, if a noun (excepting an adjective modifier) is determined, dominated codes and translation equivalents of other words can be obtained by means of an logical AND operation and by using the transfer dictionary for translation word searching. The semantic code of a noun is determined in the following manner. Namely, a logical AND operation is performed between all possible semantic codes of a noun under processing and dominated codes of an adjacent or related word, and the code with the highest frequency of occurrence obtained by the calculation is assumed as the semantic code of the word. If the calculation result is null, then this semantic code of a noun is a default semantic code. This operation will be further described by using the following example of the intermediate structure.

In this example, the Japanese word at the top of the diagram can be spelled "hiku" in western characters. At the bottom, the Japanese word on the left can be spelled "watashi" and the Japanese word on the right can be spelled "jibiki."

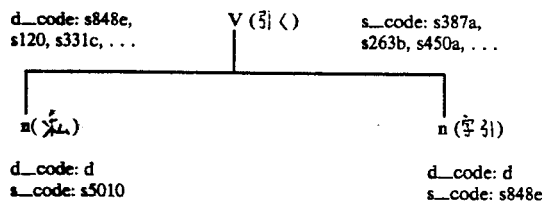

Here, the s codes are the semantic code(s) of the word at each node, and the d codes are the dominate code(s) of the word at each node. As described previously, a logical AND operation is performed between the semantic codes s5010 and s848e respectively of the nouns "私" ("watashi") and "字引" ("jibiki") and all the dominated codes of the verb "引く" ("hiku") so that the dominated code s848e is identified. Referring to the transfer dictionary for translation word searching, the Chinese translation equivalents for the words ("watashi"), "私", "字引", ("jibiki") and "引く" ("hiku") can be automatically obtained as "我" (meaning "I" in English), "字典" ("dictionary") and "查" ("look up").

FIG. 1 shows the structure of the arrangement of a machine translation apparatus of this invention. Referring to FIG. 1, block 10 represents a source language input unit such as a keyboard from which words of a source language to be processed are entered. Block 15 represents a source language parsing and intermediate form generating unit wherein the syntax and semantics of an inputted word are parsed by using a parsing dictionary 1 to obtain an intermediate structure of the source language, and the obtained structure is stored in a buffer 45. A syntax and semantics difference adjusting unit 20 fetches the intermediate structure of the source language from the buffer 45, and, while referring to a transfer dictionary 2 for difference adjusting, changes the intermediate structure of the syntax and semantics of the source language to another intermediate structure of the target language which is then stored in the buffer 45. A dominated code and semantic code searching unit 25 receives the intermediate structure of the target language obtained by the syntax and semantics difference adjusting unit 20, searches all possible dominated and semantic codes of each word of the intermediate structure and of its related word, with reference to the transfer dictionary 3 for translation word searching, identifies the dominated code and semantic code of the word under processing in accordance with the processes shown in FIGS. 2A, 2B and 2C, and stores the processing results in the buffer 45. A transfer or translation word searching unit 30 refers to the transfer dictionary 3 for translation word searching, to thereby search for the proper translation equivalent of the word whose dominated or semantic codes have been stored in the buffer 45, and stores the searched translation equivalent in the buffer 45. A target language generation unit 35 transforms the intermediate structure (also called deep structure) of the target language in the buffer 45 stored by the transfer word searching unit 30 into the surface structure of the target structure to obtain the final translation result which is stored in the buffer 45. A target language output unit 40 outputs the translation results stored in the buffer 45.

The operation of the machine translation apparatus of this embodiment constructed as above will be described using the sample sentence "彼は難しい顔をした" ("He wore a grave look"). The Japanese words in this sample sentence can be spelled "kare wa muzukashi kao wo shita" in western characters. Referring to FIG. 1, this sentence is first entered from the source language input unit 10 and sent to the source language parsing and intermediate form generating unit 15. Referring to the parsing dictionary 1, the source language parsing and intermediate form generating unit 15 parses the words and develops them into an intermediate structure which is then stored in the buffer 45. The syntax and semantics difference adjusting unit 20 fetches the stored intermediate structure of the source language from the buffer 45, and, while referring to the transfer dictionary 2 for difference adjusting, changes it to another intermediate structure of the object language to thereby obtain the intermediate structure (dependency structure) shown in FIG. 4 which is stored in the buffer 45. Next, as described previously, the dominated code and semantic code searching unit 25 determines dominated codes and semantic codes of each word in accordance with the processes shown in FIGS. 2A, 2B and 2C. The operation of this dominated code and semantic code searching unit 25 will be described in detail.

Figure 2A:
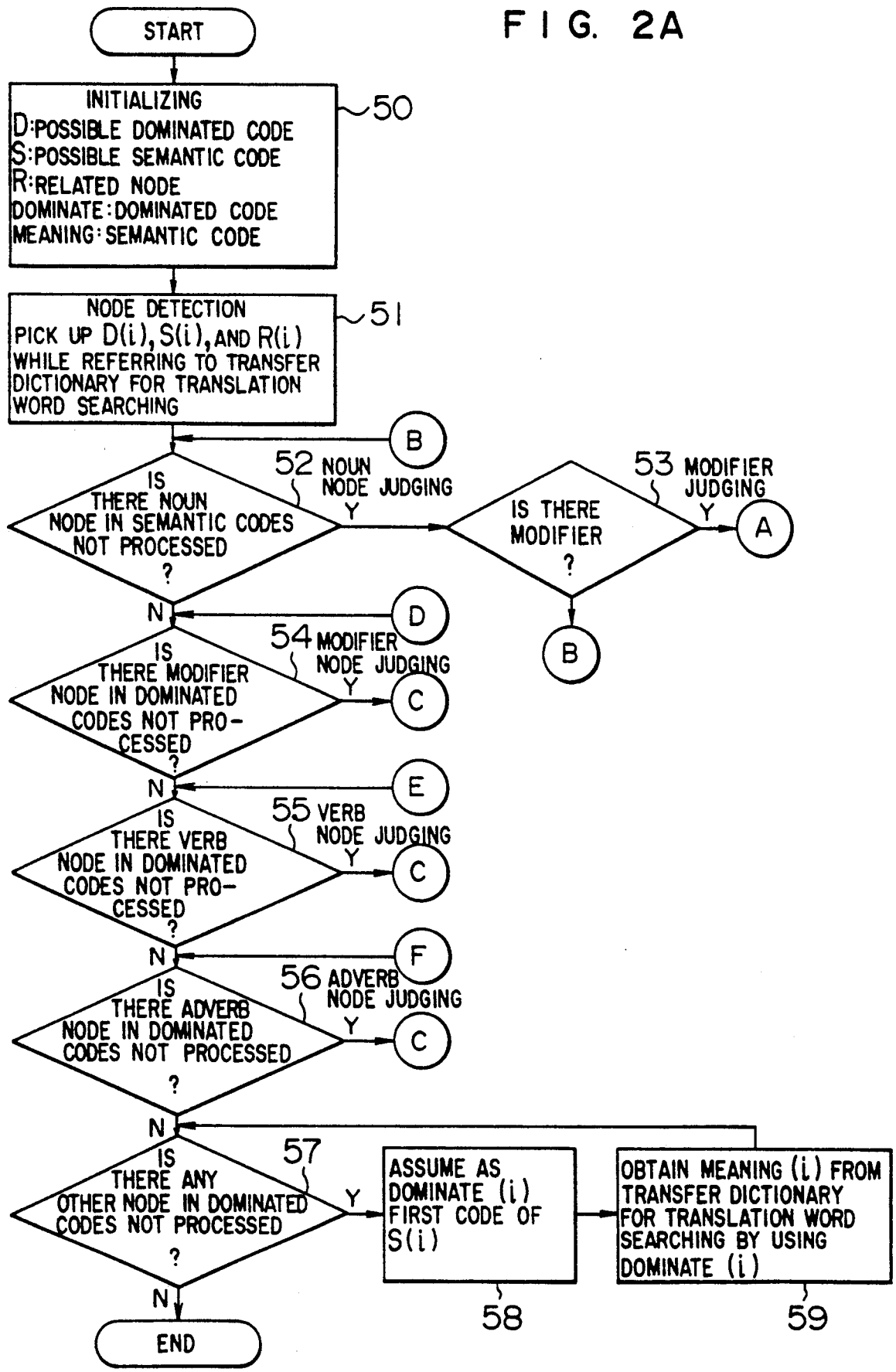
FIGS. 2A, 2B and 2C are flow charts illustrating the processes executed by the dominated code and semantic code searching unit of the embodiment.
Figure 2B:
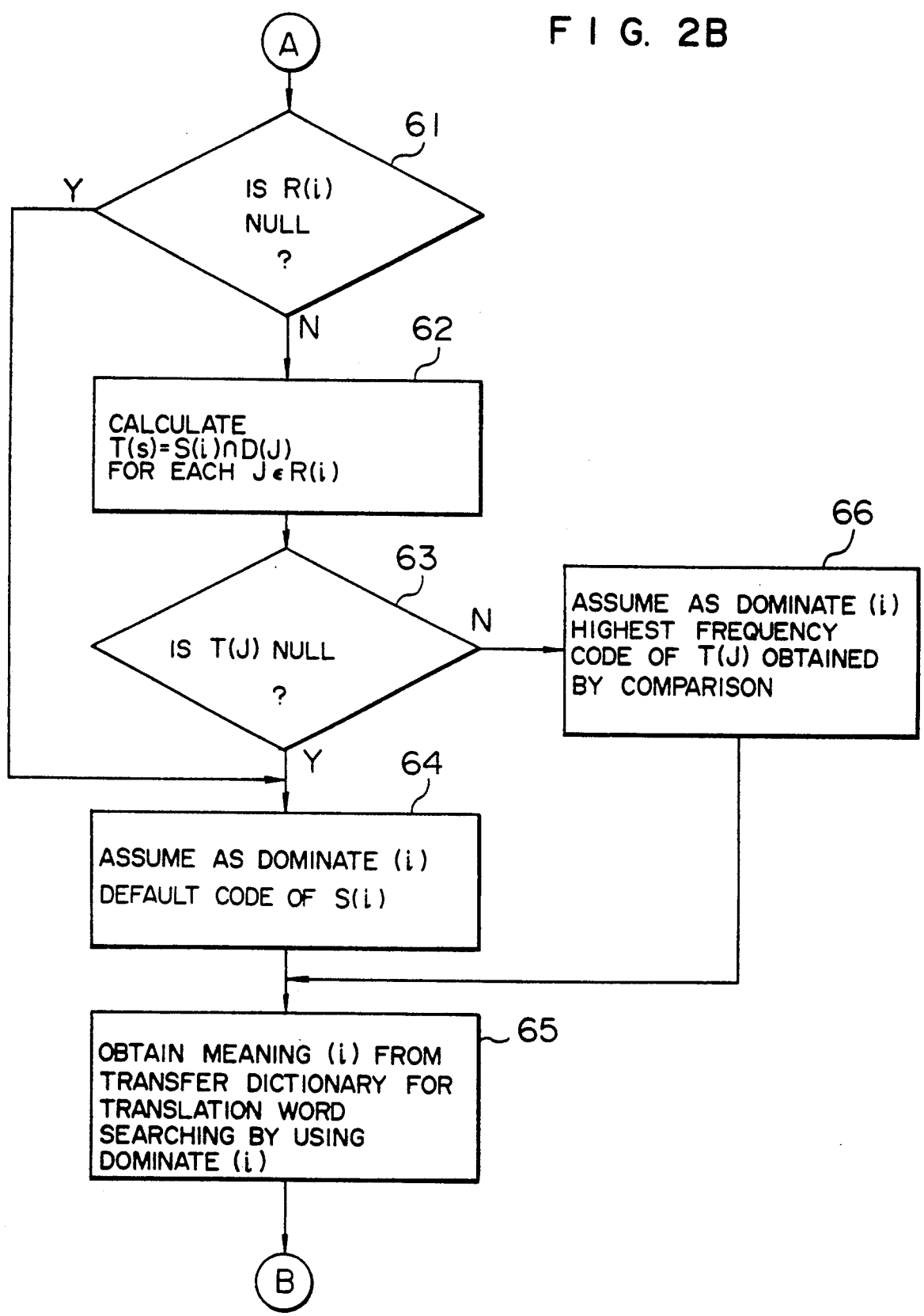
Figure 2C:
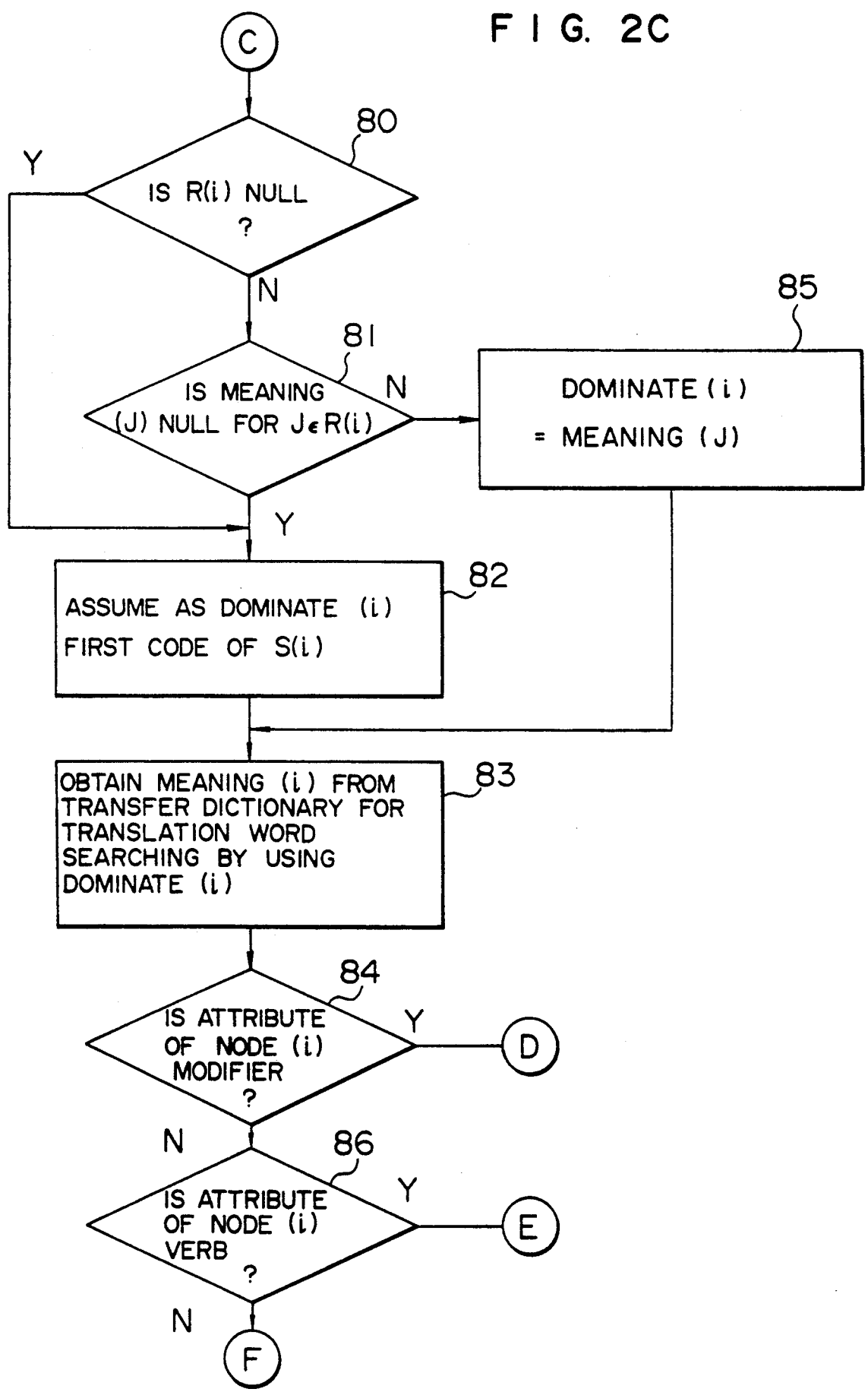
Figure 4:
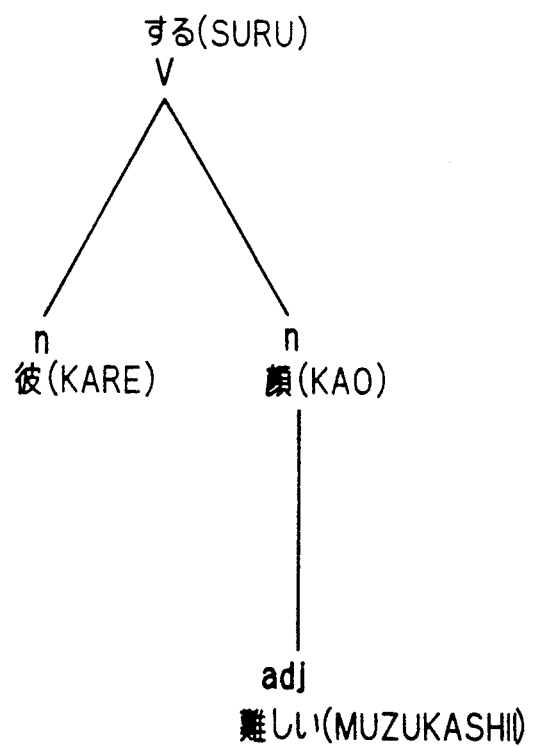
FIG. 4 is a diagram showing the intermediate structure of an exemplary source language used in the embodiment.
Figure 5:
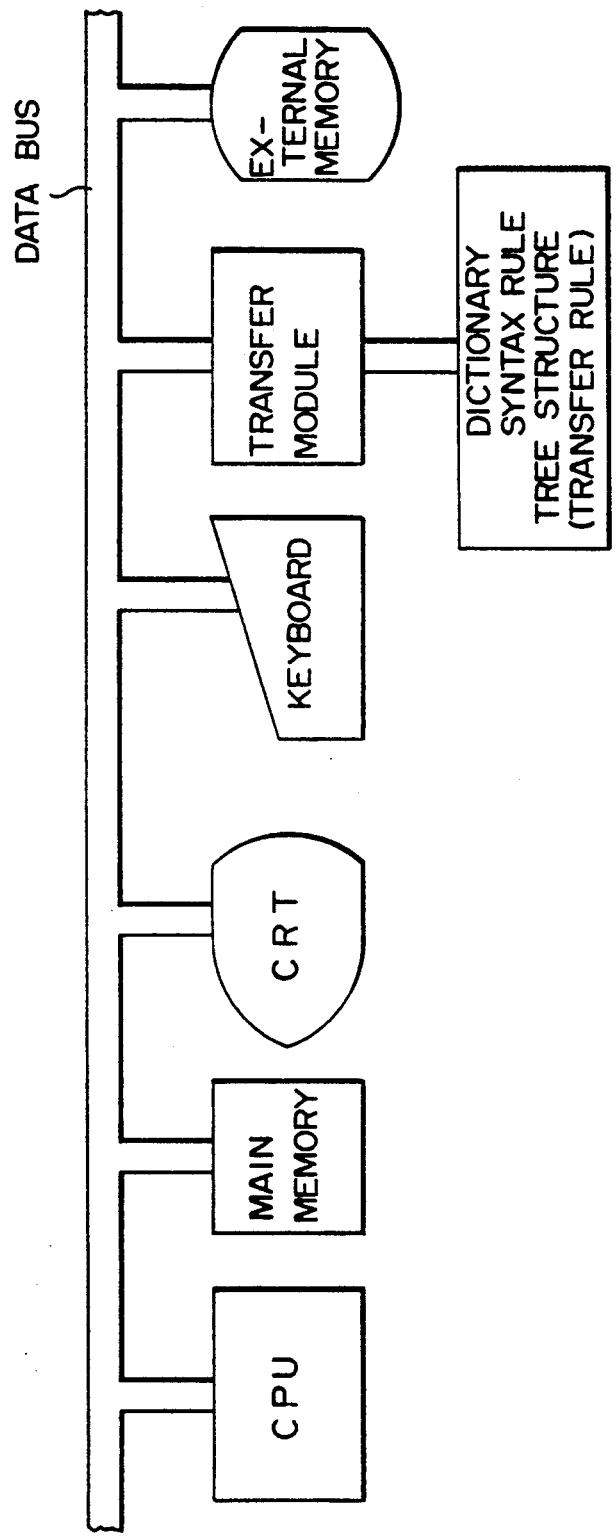
FIG. 5 is a block diagram showing the structure of a conventional machine translation apparatus.
Figure 6:
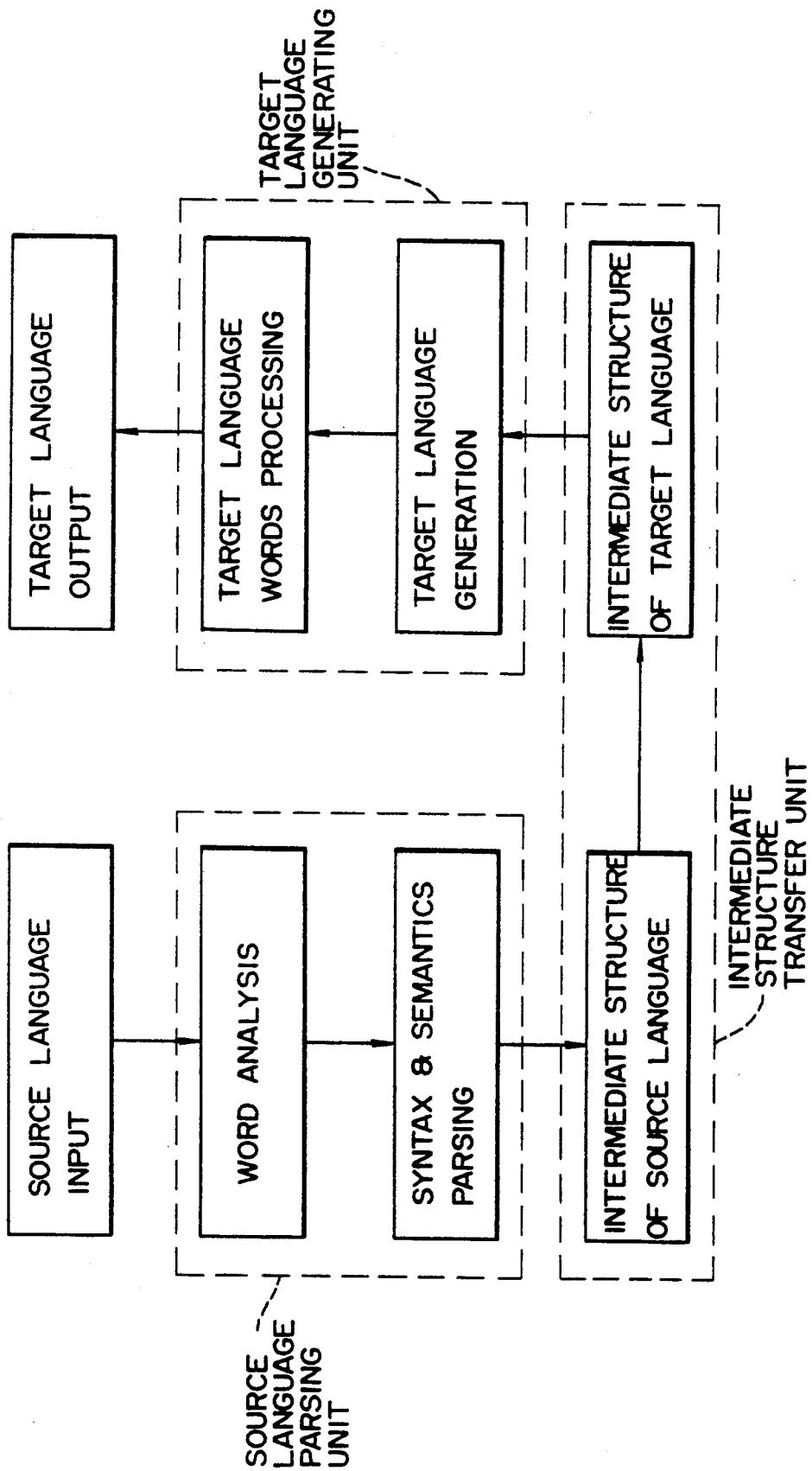
FIG. 6 is a flow chart illustrating the translation processing by an intermediate structure system.

First, the initial values for the intermediate structure shown in FIG. 4 are set at an initialization step 50 shown in FIGS. 2A, 2B and 2C. Referring to the transfer dictionary 3 for translation word searching which stores therein related words as s own in FIGS. 3A-1, 3A-2, 3B-1, and 3B-2, the following results are obtained at a node detecting step 51 for picking up respective nodes i.

D ( 彼 , or "kare")  = d
S ( 彼 , or "kare")  = {s5030}
R ( 彼 , or "kare")  = {する, or "suru"}
D ( 顔 , or "kao")   = {s49, s178, s241, s474, s655, d, ... } where D(i) represents all dominated codes at node i, S(i) all semantic codes at node i, and R(i) all related nodes i.

Next, at a noun node judgement step 52 and adjective word judgement step 53 shown in FIG. 2A, it is judged that there are nodes (彼, or "kare"), (顔, or "kao") to be processed. Then, the operation proceeds to a step 61. Since each of two nodes (彼, or "kare"), (顔, or "kao") has a related node, the operation proceeds to a logical AND operation step 62 to determine the dominated code for the two words (彼, or "kare"), (顔, or "kao"). Sets T obtained by performing logical AND operations between the dominated codes of the node "顔" ("kao") and the two related nodes "難" ("muzukashi") and "する" ("suru") are as follows:

T (難い, or "muzukashi") = S (顔, or "kao") ∩ D (難い, or "muzukashi")
                        = {s320, s611, ... } ∩ {s320, s608, ... }
                        = {s320}
T (する, or "suru")      = S (顔, or "kao") ∩ D (する, or "suru")
                        = {s320, s611, ... } ∩ {s096, s129, ... }
                        = φ

In the similar manner, the result of a logical AND operation between the dominated codes of the node "彼" ("kare") and the related node "する" ("suru") is given by:

T (する, or "suru") = S (彼, or "kare") ∩ D (する, or "suru")
                   = {s5030} ∩ {s096, s129, ... }
                   = φ

The processing for the nodes (顔, or "kao"), (彼, or "kare") proceed either to the step 66 or 64, depending upon the judgement result at the step 63. In this case, the operation proceeds to the step 66 and the following results are obtained:

dominate (顔 or "kao")  = s49
dominate (彼 or "kare") = s5030 where "dominate (i)" represents a dominate code of node i. At the step 65, the following results are obtained:

meaning (顔 or "kao")  = s320
meaning (彼 or "kare") = s5030 where "meaning (i)" represents a semantic code of node i. Thereafter, the operation returns to the noun judgement step 52 shown in FIG. 2A. There is no noun node to be processed, so that the operation proceeds to a modifier node judgement step 54. In this case, there is only a node "難い" ("muzukashi"), so that the operation enters the processing shown in FIG. 2C. First, at a step 80 it is judged as not null for the node R (難, or "muzukashi"). Then, at a judgement step 81 it is judged as not null, as described above, with respect to "meaning (顔, or "keo")", and thereafter at a step 85 the following result obtained:

dominate (難い or "muzukashi") = s320

And at a step 83 the following result is obtained:

meaning (難い, or "muzukashi") = s492a

At the succeeding step 84, the operation returns to the modifier node judgement step 54 shown in FIG. 2A. Since there is no other modifier node, the operation proceeds to a verb node judgement step 55. Upon judgement that there is a node (する, or "suru"), the operation enters again into the processings shown in FIG. 2C. In the similar manner as above, there are obtained:

dominate (する, or "suru") = s320
meaning (する, or "suru") = s361

Then the operation returns to the verb node judgement step 55 shown in FIG. 2A. At this time, since there is no node to be processed at the verb node judgement step 55, adverb node judgement step 56 and other step 57, the selection of a dominated code and semantic code is terminated. Thereafter, the operation proceeds to the transfer word searching unit 30 shown in FIG. 1, where a transfer word or translation word is selected from the transfer dictionary 3 for translation word searching, in accordance with the obtained dominated code for respective nodes. As seen from the contents of the transfer dictionary 3 for translation word searching shown in FIGS. 3A-1 to 3B-2, the translation word for "顔" ("kao") corresponding to the dominated code s320 is "表情 (meaning "expression" in English), so that this translation word is selected from the dictionary. The other translation words are also selected in a similar manner, and the following results are obtained:

lex (顔 ,     or "kao")       = 表情    ("expression")
lex (難い ,   or "muzukashi") = 不高興  ("unhappy")
lex (彼 ,     or "kare")      = 他      ("he")
lex (する ,   or "suru")      = 表し    ("show")

wherein lex (i) represents a translation word at node (i).

The target language generation unit 35 assembles these translation words to generate a target language sentence, in accordance with the intermediate structure obtained at the syntax and semantics difference adjusting unit 20. The obtained Chinese sentence, which means "He wore a grave look" in English) is:

「他露出不高興的表情」 which is outputted from the target language output unit 40.

According to this embodiment executing the above operations, an improper translation such as "他做difficult的表情" (in English, "He did a difficult expression") will never occur, but a sentence of proper translation can be obtained.

According to the present invention, the meanings of not only a particular node to be processed but also its, related node are considered in selecting a proper translation word. Accordingly the problem associated with a polysemous word can be solved, thereby improving the quality of automatic machine translation and reducing the burden on the user. Further, significant information can be obtained through mathematic calculation of semantic and dominated codes, so that it is not necessary to store all associated information in a dictionary, thereby reducing memory capacity while retaining good efficiency and practicability.

What is claimed is:

1. A machine translation apparatus for translating a source language input sentence with a polysemous word into a target language sentence, the polysemous source language word in the input sentence having a plurality of possible translations in the target language, comprising:
    a transfer dictionary for translation word searching, the transfer dictionary including means for storing a plurality of source language words, at least one semantic code for every source language word, and at least one target language word for every semantic code, wherein the source language words stored in the transfer dictionary include polysemous source language words, and wherein the transfer dictionary additionally includes means for storing semantic complex information for identifying the possible translations of the polysemous source language words, the semantic complex information including a plurality of dominated codes for each of the polysemous source language words;
    a source language parsing and intermediate form generating unit means for parsing the input sentence to obtain an intermediate representation having a plurality of nodes which correspond to source language words in the input sentence, the nodes of the intermediate representation including a particular node which corresponds to the polysemous word in the input sentence and a neighboring node which corresponds to a word in the input sentence that is grammatically related to the polysemous word;
    a dominated code and semantic code searching unit means for selecting a dominated code and semantic code for the polysemous word in the input sentence, the dominated code and semantic code searching unit means including means for comparing the dominated codes of the polysemous word which corresponds to the particular node of the intermediate representation with the at least one semantic code of the grammatically related word which corresponds to the neighboring node of the intermediate representation; and
    a translation word searching unit means for determining appropriate target language words for the source language words corresponding to each node of the intermediate representation, the translation word searching unit means including means for using dominated codes selected by the dominated code and semantic code searching unit means as keys to search out appropriate target words from the transfer dictionary.

2. The translation apparatus of claim 1, wherein the transfer dictionary additionally stores a lexical category key for every source language word.

3. The translation apparatus of claim 1, wherein the dominated codes for a given polysemous source language word stored in the transfer dictionary are selected from the group consisting of a default code and semantic codes for other source language words.

4. A machine translation apparatus for translating a source language sentence into a target language sentence, comprising:
    a transfer dictionary for translation word searching, the transfer dictionary including means for storing a plurality of source language words each having a single meaning or polysemous meanings, and means for storing a single set or multiple sets of semantic information corresponding to the single meaning or polysemous meanings of each of the words, each set of semantic information including a dominated code, a semantic code, and a translation word in the target language, the dominated codes and semantic codes having a hierarchical code structure to represent the semantic information of each meaning;
    a source language parsing and intermediate form generating unit means for generating an intermediate representation of the source language sentence, the intermediate representation having a plurality of nodes which correspond to words in the source language sentence, nodes in the intermediate representation being neighboring nodes if they correspond to words that are grammatically related in the source language sentence;
    a dominated code and semantic code searching unit means for selecting a dominated code and a semantic code for each word of the source language sentence, the dominated code and semantic code searching unit means including means for executing a logical operation applicable to the single set or multiple sets of semantic information corresponding to a word which corresponds to a particular node of the intermediate representation with the single set or multiple sets of semantic information corresponding to words which correspond to nodes of the intermediate representation that are neighboring nodes to the particular node, all the information being searched and retrieved from said transfer dictionary by using a source language word as a searching key; and
    a translation word searching unit means for translation word searching for each word of the source language sentence, by using the dominated codes selected by said dominated code and semantic code searching unit means as searching keys to search out translation words from said transfer dictionary.

5. A machine translation apparatus as defined in claim 4, wherein said dominated code and semantic code searching unit means comprises means for executing a set inclusion operation applicable to the dominated code corresponding to the word which corresponds to the particular node with the semantic codes corresponding to words which correspond to the neighboring nodes in order to select the dominated code for the word corresponding to the particular node.

6. A machine translation apparatus as defined in claim 4, wherein the transfer dictionary additionally includes means for storing a lexical category key for every source language word, and wherein the dominated code and semantic code searching unit means comprises means for using the source language words and the lexical category keys as searching keys for transfer dictionary searching.

* * * * *